US007839416B2

(12) United States Patent
Ebensberger et al.

(10) Patent No.: US 7,839,416 B2
(45) Date of Patent: Nov. 23, 2010

(54) VIRTUAL COATINGS APPLICATION SYSTEM

(75) Inventors: Jason M. Ebensberger, Cedar Falls, IA (US); Michael J. Bolick, Waterloo, IA (US); Jeremiah G. Treloar, Waterloo, IA (US); Richard J. Klein, II, Waterloo, IA (US); Eric C. Peterson, San Antonio, TX (US); Chad J. Zalkin, San Antonio, TX (US); James B. Fisher, San Antonio, TX (US); Leslie C. Hughes, Bulverde, TX (US)

(73) Assignee: University of Northern Iowa Research Foundation, Cedar Falls, IA (US)

( * ) Notice: Subject to any disclaimer, the term of this patent is extended or adjusted under 35 U.S.C. 154(b) by 1263 days.

(21) Appl. No.: 11/372,714

(22) Filed: Mar. 10, 2006

(65) Prior Publication Data

US 2007/0209585 A1 Sep. 13, 2007

(51) Int. Cl.
*G09G 5/02* (2006.01)
(52) U.S. Cl. ...................... 345/592; 345/634
(58) Field of Classification Search ....................... None
See application file for complete search history.

(56) References Cited

U.S. PATENT DOCUMENTS

| | | | |
|---|---|---|---|
| 5,102,045 A | | 4/1992 | Diana |
| 5,182,548 A | * | 1/1993 | Haeberli ..................... 345/639 |
| 5,289,974 A | | 3/1994 | Grime et al. |
| 5,592,597 A | | 1/1997 | Kiss |
| 5,598,972 A | | 2/1997 | Klein, II et al. |
| 5,672,852 A | * | 9/1997 | Fukuzaki et al. ......... 178/18.07 |
| 5,757,498 A | | 5/1998 | Klein, II et al. |
| 5,812,257 A | | 9/1998 | Teitel et al. |

(Continued)

FOREIGN PATENT DOCUMENTS

WO 92/07346 A1 4/1992

(Continued)

OTHER PUBLICATIONS

PCT Search Report dated Aug. 13, 2007.

(Continued)

*Primary Examiner*—M Good Johnson
(74) *Attorney, Agent, or Firm*—Andrus, Sceales, Starke & Sawall, LLP

(57) ABSTRACT

A virtual coatings application system has several features to enhance the realism of simulated spray painting. The system generally includes a display screen on which is defined a virtual surface (such as a truck door) that is intended to be virtually painted or coated by the user. The user operates an instrumented spray gun controller that outputs one or more signals representing data as to the status of the controls on the spray gun controller. The system also has a motion tracking system that tracks the position and orientation of the spray gun controller with respect to the virtual surface defined on the display screen. Simulation software generates virtual spray pattern data in response to at least the data from the spray gun controller and the position and orientation data received from the tracking system. Virtual spray pattern images are displayed in real time on the display screen in accordance with the accumulation of virtual spray pattern data at each location on the virtual surface.

21 Claims, 9 Drawing Sheets

U.S. PATENT DOCUMENTS

| | | | |
|---|---|---|---|
| 5,857,625 | A | 1/1999 | Klein et al. |
| 5,868,840 | A | 2/1999 | Klein, II et al. |
| 5,951,296 | A | 9/1999 | Klein |
| 6,176,837 | B1 | 1/2001 | Foxlin |
| 6,409,687 | B1 | 6/2002 | Foxlin |
| 6,717,584 | B2 | 4/2004 | Kulczycka |
| 6,757,068 | B2 | 6/2004 | Foxlin |
| 6,801,211 | B2 | 10/2004 | Forsline et al. |
| 6,862,020 | B2* | 3/2005 | Clapper ...................... 345/179 |
| 6,896,192 | B2 | 5/2005 | Horan et al. |
| 6,963,331 | B1 | 11/2005 | Kobayashi et al. |
| 7,106,343 | B1 | 9/2006 | Hickman |
| 7,208,031 | B1* | 4/2007 | Hendrickson ................. 96/351 |
| 7,298,385 | B2* | 11/2007 | Kazi et al. ................... 345/633 |
| 7,542,032 | B2* | 6/2009 | Kruse ......................... 345/418 |
| 2003/0178503 | A1 | 9/2003 | Horan et al. |
| 2003/0218596 | A1 | 11/2003 | Eschler |
| 2004/0046736 | A1 | 3/2004 | Pryor et al. |
| 2004/0201857 | A1 | 10/2004 | Foxlin |
| 2004/0213915 | A1* | 10/2004 | Andersen ................. 427/421.1 |
| 2004/0233223 | A1 | 11/2004 | Schkolne et al. |
| 2005/0196543 | A1* | 9/2005 | Morton .................... 427/421.1 |
| 2006/0007123 | A1 | 1/2006 | Wilson et al. |
| 2006/0171771 | A1 | 8/2006 | Kruse |

FOREIGN PATENT DOCUMENTS

| | | | |
|---|---|---|---|
| WO | WO0241127 A2 | 5/2002 | |

OTHER PUBLICATIONS

Reilly: "New Technologies reflect success", Closed Loop, vol. 15.2, 2005, pp. 1-4, Iowa Waste Reduction Center. Retrieved from the Internet: www.iwrc.org/downloads/pdf/CLSpring2005.pdf.

Iowa Waste Reduction Center: "STAR4D New Technologies Reflect Success", 2005, p. 1. Retrieved from the Internet: 222.star4d.org/uploads/New_Technologies.pdf.

Polhemus: "The Johnson Center for Virtual Reality: Industrial Training Simulations", 2005, p. 1. Retrieved from the Internet: www.polhemus.com/polhemus_editor/assets/Pinetechcollege_FASTRAK.pdf.

Heckman: "Virtual Reality Simulator System and Training Program", 2005, pp. 1-2. Retrieved from the Internet: www.mnscu.edu/media/publications/pdf/fed05pine.pdf.

Wormell, Foxlin: "Advancements in 3D Interactive Devices for Virtual Environments", 2003, pp. 1-10. Retrieved from the Internet: www.isense.com/uploadedFiles/Products/White_Papers/Advancements%20in%203D%20Interactive%20Devices%20for%20Virtual%20Environments.pdf.

"We Bring 3D To Life", InterSense web page, pp. 1-2.

"IS-900 MiniTrax Devices", InterSense web page.

"Cost Effective 6-DEF Tracking", InterSense web page.

"InterSense delivers Tracking Systems to support a Welding Simulator Program developed by Immersion SAS", InterSense web page, pp. 1-2.

"Technical Overview PCTracker", InterSense web page, pp. 1-5.

"Industrial Simulation & Training", InterSense web page.

"The Virtual Welding Trainer", CS Wave web page, Index—pp. 1-3;—"Architecture", CS Wave web page, pp. 1-2;—"Module formateur", CS Wave web page, pp. 1-2;—"Module eleve", CS Wave web page, pp. 1-2.

"Johnson Center for Virtual Reality", Pine Technical College web site, admitted prior art.

"Fastrak Technical Summary", Polhemus web site, pp. 1-3;—"Industrial Training Simulations", Polhemus web site , p. 1.

"SwRI-Owned Three-Dimensional Graphics Engine Development, 07-9459", Southwest Research Institute, Abstract re: GRAIL™ Graphics Interface Library, pp. 1-2.

John Heckman et al, Virtual Reality Painter Training Becomes Real, Metal Finishing, May 2003, p. 1, 22 & 24-26, vol. 101, Issue 5.

Maneesh Agrawala et al, 3D Painting on Scanned Surfaces, Symposium on Interactive 3D Graphics, 1995, pp. 145-150 & 215, Association of Computing Machinery.

Carolina Cruz-Neira et al, Surround-Screen Projection-Based Virtual Reality: The Design and Implementation of the CAVE, 1993, p. 135-142, Association for Computing Machinery.

Julie Daily et al, 3D Painting: Paradigms for Painting in a New Dimension, CHI 95 Mosaic of Creativity, May 7-11, 1995, p. 296-297, CHI Companion 95, Denver, Colorado.

Kenneth Fast et al, Virtual Training for Welding, Computer Society, Mar. 2004, Third IEEE & ACM International Symposium on Mixed and Augmented Reality.

Pat Hanrahan et al, Direct WYSIWYG Painting and Texturing on 3D Shapes, Computer Graphics, Aug. 1990, p. 215-223, vol. 24, Association for Computing Machinery.

J.A. Jordan et al, Virtual Reality Training Leads to Faster Adaptation to the Novel Psychomotor Restrictions Encountered by Laparoscopic Surgeons, Surgical Endoscopy, Aug. 2001, p. 1080-1084, Springer-Verlag New York, Inc.

Ron Joseph et al, The Environmental and Cost Benefits of Painter Training, Metal Finishing, Mar. 1998, p. 26, 28, 30-31, Elsevier Science Inc.

Daniel F. Keefe et al, CavePainting: A Fully Immersive 3D Artistic Medium and Interactive Experience, 2001, p. 85-93, ACM.

F.D. Rose et al, Transfer of Training from Virtual to Real Environments, Proc. 2nd Euro. Conf. Disability, Virtual Reality & Assoc. Tech., 1998, p. 69-75, ECDVRAT and University of Reading, UK.

F.D. Rose et al, Training in Virtual Environments: Transfer to Real World Tasks and Equivalence to Real Task Training, Ergonomics, 2000, p. 494-511, vol. 43, Taylor and Francis Ltd.

Neal E. Seymour et al, Virtual Reality Training Improves Operating Room Performance, Annals of Surgery, Oct. 2002, p. 458-464, vol. 236, Lippincott, Williams & Wilkins, Inc.

D. Wormell et al, Advancements in 3D Interactive Devices for Virtual Environments, InterSense, Inc., 2003, p. 47-56, The Eurographics Association.

"We Bring 3D To Life", InterSense web page, pp. 1-2, www.isense.com, visited Nov. 10, 2005.

"IS-900 MiniTrax Devices", InterSense web page, www.intersense.com, visited Nov. 10, 2005.

"Cost Effective 6-DEF Tracking", InterSense web page, www.intersense.com, visited Nov. 10, 2005.

"InterSense delivers Tracking Systems to support a Welding Simulator Program developed by Immersion SAS", InterSense web page, pp. 1-2, www.isense.com/news, visited Nov. 10, 2005.

"Technical Overview PCTracker", InterSense web page, pp. 1-5, www.isense.com, visited Nov. 10, 2005.

"Industrial Simulation & Training", InterSense web page, www.isense.com, visited Nov. 10, 2005.

"The Virtual Welding Trainer", CS Wave web page, Index—pp. 1-3;—"Architecture", CS Wave web page, pp. 1-2;—"Module formateur", CS Wave web page, pp. 1-2;—"Module eleve", CS Wave web page, pp. 1-2, www.c-s.fr/index/architecture, www.c-s.fr/index/moduleeleve, and www.c-s.fr/index/moduleformateur, visited Nov. 10, 2005.

"Johnson Center for Virtual Reality", Pine Technical College web site, admitted prior art, www.pintech.com, visited Nov. 10, 2005.

"Fastrak Technical Summary", Polhemus web site, pp. 1-3;—"Industrial Training Simulations", Polhemus web site , p. 1; www.polhemus.com, visited Dec. 27, 2005.

"SwRI-Owned Three-Dimensional Graphics Engine Development, 07-9459", Southwest Research Institute, Abstract re: GRAIL™ Graphics Interface Library, pp. 1-2, www.swri.org, visited Nov. 10, 2005.

Maneesh Agrawala et al, 3D Painting on Scanned Surfaces, 1995 Symposium on Interactive 3D Graphics, Monterey, CA, pp. 145-150 & 215, Association of Computing Machinery, Stanford University.

Carolina Cruz-Neira et al, Surround-Screen Projection-Based Virtual Reality: The Design and Implementation of the CAVE, Electronic Visualization Laboratory, The University of Illinois at Chicago, Association for Computing Machinery 1993, ACM-0-89791-601-8/98/008, p. 135-142.

Daniel F. Keefe et al, CavePainting: A Fully Immersive 3D Artistic Medium and Interactive Experience, Department of Computer Science, Brown University Providence, RI, 2001 Research Triangle Park, NC, ACM 2001 1-58113-291-1/01/01, p. 85-93.

Reilly: "New Technologies reflect success", Closed Loop, vol. 15.2, 2005, pp. 1-4, Iowa Waste Reduction Center. Retrieved from the Internet: www.iwrc.org/downloads/pdf/CLSpring2005.pdf, visited Jul. 26, 2007.

Iowa Waste Reduction Center: "STAR4D New Technologies Reflect Success", 2005, p. 1. Retrieved from the Internet: 222.star4d.org/uploads/New_Technologies.pdf, visited Jul. 25, 2007.

Heckman: "Virtual Reality Simulator System and Training Program", 2005, pp. 1-2. Retrieved from the Internet: www.mnscu.edu/media/publications/pdf/fed05pine.pdf, visited Jul. 26, 2007.

Polhemus: "The Johnson Center for Virtual Reality: Industrial Training Simulations", 2005, p. 1. Retrieved from the Internet: www.polhemus.com/polhemus_editor/assets/Pinetechcollege_FASTRAK.pdf, visited Jul. 26, 2007.

Wormell, Foxlin: "Advancements in 3D Interactive Devices for Virtual Environments", 2003, pp. 1-10. Retrieved from the Internet: www.isense.com/uploadedFiles/Products/White_Papers/Advancements%20in%203D%20Interactive%20Devices%20for%20Virtual%20Environments.pdf, visited Jul. 26, 2007.

* cited by examiner

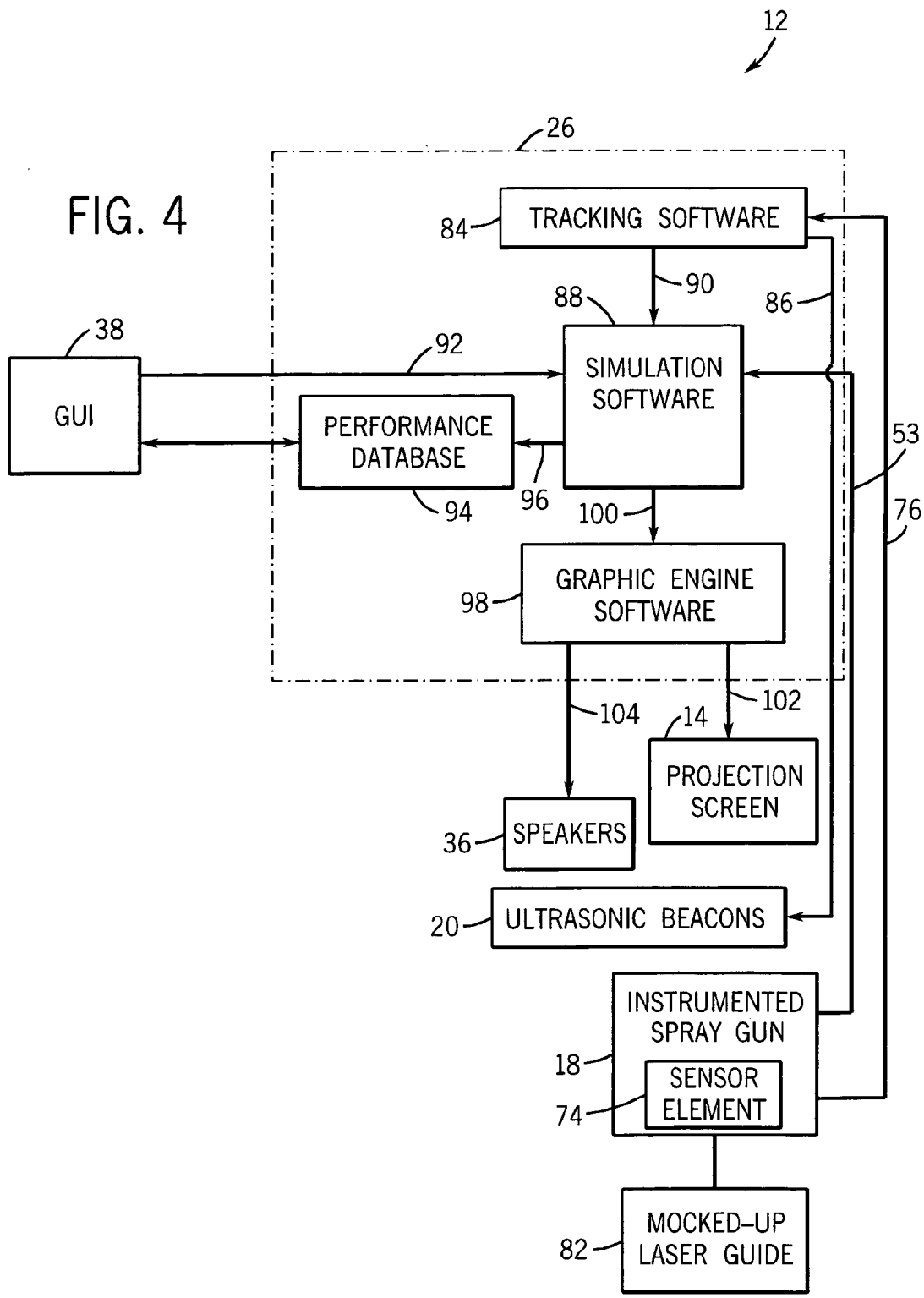

VIRTUAL COATINGS APPLICATION SYSTEM

FIELD OF THE INVENTION

The invention relates to spray gun training and performance analysis methods and systems. In particular, the invention relates to the use of computer simulation and virtual reality systems for training and analyzing proper spray techniques.

BACKGROUND OF THE INVENTION

It can be difficult for a person using a spray gun to keep the spray nozzle at the optimum distance and orientation from the surface being painted or coated, while at the same time applying the proper thickness of finish to the surface. This is especially difficult for novices. As an example of the difficulties facing novices, consider that merely placing the nozzle too close to the surface can cause an uneven wet film build as well as runs. The quality and uniformity of coverage typically improves as the distance between the spray nozzle and the surface increases, however, it is not desirable that the spray distance between the nozzle and the surface be substantially larger than an optimum spray distance. Letting the spray distance be too large can cause overspray, paint fogging, or otherwise decrease the efficiency of paint or coating transfer onto the surface. Having the nozzle too far from the surface not only increases the number of coats necessary to provide a sufficient wet film build for proper paint coverage, but also increases the cost of complying with environmental regulations. High levels of overspray and fogging increases the amount of volatile organic compounds that can escape from the spray booth, and also increases the amount of hazardous waste that must be disposed of from spray booth air filtering systems.

Training and practical experience help novices improve their skills. Hands on training has been very successful in improving coating efficiency and reducing environmental impacts. However, hands-on training is time consuming, labor intensive and expensive. These factors have made training of large groups, such as military personnel, complicated. In addition, hands-on training of finishing techniques with the actual finishing equipment and materials has other drawbacks including the generation of harmful emissions, waste of finishing material, and limited ability to measurement performance criteria such as transfer efficiency or build efficiency. As a practical matter, hands-on training tends to limit the number of techniques that can be practiced and evaluated, especially with respect to multiple finishing materials and surfaces.

The use of computer simulations and virtual reality systems to foster practice and training of proper spray painting techniques is known in the prior art. For example, the application of liquid coatings in industrial paint booths has been simulated by the Johnson Center for Virtual Reality located at Pine Technical College in Minnesota. This system uses an electromagnetic six degree of freedom tracking system to track the position and orientation of a spray gun controller with respect to a projection screen. Computer models are used to display a virtual spray pattern on the screen in accordance with signals from the tracking system. The goal of this virtual reality system is to provide the user with a realistic training environment to learn proper spray techniques. Because application of the liquid coating is simulated, no material is expended and a harmful emissions and waste are not produced. Also, user performance data can be stored in a database for print out and later monitoring. To the extent that computer simulation and virtual reality systems provide a realistic experience, these systems can be a worthy supplement to hands-on training.

One object of the present invention is to develop a virtual coating application system that provides a more realistic simulation of the spray painting experience for the user. The invention as described herein provides several features contributing to improvements in this respect. Another object of the invention is to provide a virtual coating application system that is able to monitor performance data such as total finishing time, transfer efficiency, build efficiency, amount of finish used and approximate mil thickness and provide the user and the instructor with meaningful feedback, which in some cases can be immediate.

SUMMARY OF THE INVENTION

The invention is a virtual coatings application system which has several features that enhance the realism of simulated spray painting. The system generally includes a display screen on which is defined a virtual surface (such as a truck door) that is intended to be virtually painted or coated by the user. The user operates an instrumented spray gun controller that outputs one or more signals representing data as to the status of the controls on the spray gun controller. The system also has a motion tracking system that tracks the position and orientation of the spray gun controller with respect to the virtual surface defined on the display screen. Simulation software in a computer, preferably a desk top or laptop PC, generates virtual spray pattern data in response to at least the data from the spray gun controller and the position and orientation data received from the tracking system. A virtual spray pattern image is displayed in real time on the display screen in accordance with the accumulation of virtual spray pattern data at each location on the virtual surface.

The preferred embodiment of the invention simulates spray painting with a high volume low pressure spray gun, which is typically used in automotive or military applications. In one aspect of the preferred embodiment of the invention, the simulation software includes a paint model that outputs virtual spray pattern data to characterize the resulting pattern of virtual spray as a function of time at least in response to the standoff distance and angle of the spray gun controller relative to the virtual surface as well as data representing maximum virtual flow rate through the spray gun controller, spray fan size and air pressure. In addition, the paint model also receives information regarding the position of the trigger on the spray gun controller thus allowing realistic simulation of partial triggering and hence partial spraying by the user. This allows the user to move the spray gun controller closer to the virtual surface and apply a small partial spray to a discrete area on the virtual surface.

The paint model is preferably based on actual data collected from spray patterns generated for various spray gun settings. The preferred model simulates coverage distribution in an elliptical pattern in which the inner elliptical radii for width and height define an area of constant rate finish coverage and the outer elliptical radii for width and height define the outer extent to which the rate of finish coverage becomes negligible. The area between the inner and outer radii is a spatter coverage region, and in accordance with the preferred embodiment of the invention, finish coverage falls off linearly between the inner and outer radii throughout this region. Realism in the spatter region is dependant in part on the ability of the system to effectively simulate the extent of atomization for the range of the various spray gun settings.

The total finish flow rate per unit time (i.e. per software timing cycle) is determined by the settings for the maximum virtual flow rate for finish through the spray gun controller, the position of the trigger and preferably other relevant parameters; or air pressure for high volume low pressure spray gun applications, as well as a shear effect transfer efficiency parameter as determined or predicted from experimental data. The mass of finish deposited per unit time is then distributed over the elliptical spray pattern in accordance with the elliptical model. Note that the elliptical radii, as well as the mass of droplets in the spatter region, are preferably selected using an algorithm based on fluid flow rate (i.e., fluid pressure for a spray gun having a needle valve), fan size and air pressure. The algorithm is based on actual data collected for spray patterns generated at various spray gun settings. Preferably, each location on the virtual surface has an associated alpha channel which controls transparency of the coating at that location (e.g. pixel) based on accumulation of virtual spray at the given location, thus realistically simulating fade-in or blending for partial coverage on the virtual surface.

In another aspect of the preferred embodiment of the invention, the spray gun controller is a high volume low pressure spray gun instrumented with a variable positionable trigger and a trigger sensor, preferably a potentiometer, detecting the position of the trigger and generating a signal representing the position of the trigger. The trigger signal is sent to the computer. In addition, the spray gun controller has a flow rate control knob that allows adjustment of the maximum virtual fluid flow rate for the spray gun controller. A sensor, again preferably a potentiometer, senses the position of the control knob and generates a signal which is sent to the computer and is used to scale trigger position data. In this way, controls on the instrumented spray gun control the rate of virtual fluid flow onto the virtual surface in a manner that is similar to controls on actual high volume low pressure spray guns in the field. The preferred instrumented spray gun controller also includes a fan size adjustment knob that allows for adjustment of the virtual fan size for the spray gun controller, as well as a sensor, again a potentiometer, that senses the position of the knob and generates a signal that is sent to the computer. Thus, allowing the user to adjust the fan size of the virtual spray in a manner similar to an actual high volume low pressure spray gun.

The preferred tracking system is a hybrid inertial and ultrasonic, six degree of freedom tracking system. Preferably, a combined inertial and ultrasonic sensor is mounted on the instrumented spray gun controller to sense linear and angular momentum as well as ultrasonic signals generated by a beacon of ultrasonic transmitters mounted above or adjacent the virtual work space in front of the display screen. The preferred tracking system provides accurate six degree of freedom (x, y, z, pitch, yaw and roll) tracking data, and is well suited to avoid interference that can tend to corrupt data with other types of tracking systems. The signals from the sensors on the spray gun controller are preferably sent to the computer via a USB connection for use by simulation software and/or graphics engine software. The cable can be housed within a hose to further simulate a compressed-air hose which would typically be attached to a high volume low pressure spray gun controller.

In another aspect of the preferred embodiment of the invention, the system has a graphical user interface that allows the user to select training set-up parameters and settings for the instrumented spray gun controller as well as view performance criteria and toggle on or off various optional features of the system. For example, the user can select finish color for virtual paint using the graphical user interface, and in accordance with the preferred embodiment of the invention, can change the color during a training session. This feature allows the user to paint an undercoat having a first color on the virtual surface and then change the color for an overcoat; or the user could change colors during the application of a coat, perhaps multiple times such as would be necessary to paint camouflage. The invention can also be programmed to overlay an electronic stencil over the image of the virtual surface, thus preventing accumulated spray from accumulating on the blocked regions of the virtual surface.

The graphical user interface also preferably allows the user to select whether overspray is displayed on the screen. Overspray is virtual paint that misses the virtual surface of the part on the screen. Preferably, overspray is shown in a color distinct from the color of the virtual surface of the part and the color of the paint chosen by the user. The preferred graphical user interface also allows the user to select whether virtual paint accumulation is shown in single color mode (as described above with respect to the paint model) or in multi-color accumulation mode in which multiple colors are used to depict the depth of accumulated paint thickness. Both of these features effectively provide immediate visual feedback to the user and his or her instructor.

The preferred configuration for the screen on which the virtual surface is displayed also includes one or more icons set apart from the displayed virtual surface, which can be activated by the user pointing the spray gun controller at the icon and pulling the trigger. While toggle icons can be provided in this manner for various features, the preferred embodiment includes a toggle icon for pausing the training session and a toggle icon for selecting whether to show virtual paint accumulation in multicolor accumulation mode or in the single color mode.

The preferred graphical user interface also allows the user to select whether to play audio simulating the noise of compressed air. The preferred system includes loudspeakers that are driven by the simulation software, if this feature is toggled on, to simulate the sound of compressed air when the trigger on the spray gun controller is activated thus simulating sound expected in an actual high volume low pressure spray gun painting environment. Preferably, the simulation software uses digital recordings of actual compressed air taken at various air pressure settings. The volume of the compressed air preferably varies with respect to the air pressure setting, which is entered by the user via the graphical user interface.

In another aspect of the preferred embodiment of the invention, various performance data for the current training session and past training sessions is preferably displayed on the graphical user interface for the logged-in user. The graphical user interface displays real time data and analysis for the current training session such as total finishing time, transfer efficiency, build efficiency, amount of finish used and approximate mil thickness thus providing the user and the instructor with meaningful feedback. It is preferred that the color of the displayed value for accumulated build thickness change to indicate when the average has exceeded the selected target thickness in order to alert the user. Moreover, as mentioned, the GUI preferably displays a table summarizing the scores of previous training sessions for the logged in user, thus allowing easy reference for progress analysis. The display screen on which the virtual surface is displayed may also display the student's performance data or spray gun settings so that this information is within the user's scope of vision during the training session, thus providing immediate feedback of the displayed information.

In yet another aspect of the invention, the system can simulate the use of a laser targeting and positioning system such as is disclosed in U.S. Pat. Nos. 5,598,972; 5,857,625; and 5,868,840, all incorporated herein by reference. These systems propagate two converging light or laser beams from a spray gun onto a surface being painted in order to provide a visual aid for positioning the spray gun at the proper standoff distance and orientation from the surface being painted. In the present invention, the graphical user interface preferably allows the user to select whether the system should simulate the use of such a targeting and positioning system.

Hands-on performance is often monitored in the field using a magnetic overlay which is laid over the painted part after finishing. These magnetic overlays typically cover the entire surface of the painted except for the placement of several openings which define points at which build thickness is measured. The invention can also be configured to provide an electronic version of these electronic overlays, once the training session is complete, in order to monitor the accumulated build thickness at various points on the virtual surface. Preferably, the monitoring openings in the electronic overlay will mimic the location of the openings in magnetic overlays typically used in the field.

Various other aspects and features of the invention should be apparent to those skilled in the art upon reviewing the following drawings and description thereof.

BRIEF DESCRIPTION OF THE DRAWINGS

FIG. 4 is a block diagram showing the elements and data flow of a virtual reality coatings application system in accordance with the preferred embodiment of the invention.

DETAILED DESCRIPTION OF THE INVENTION

Figure 1:
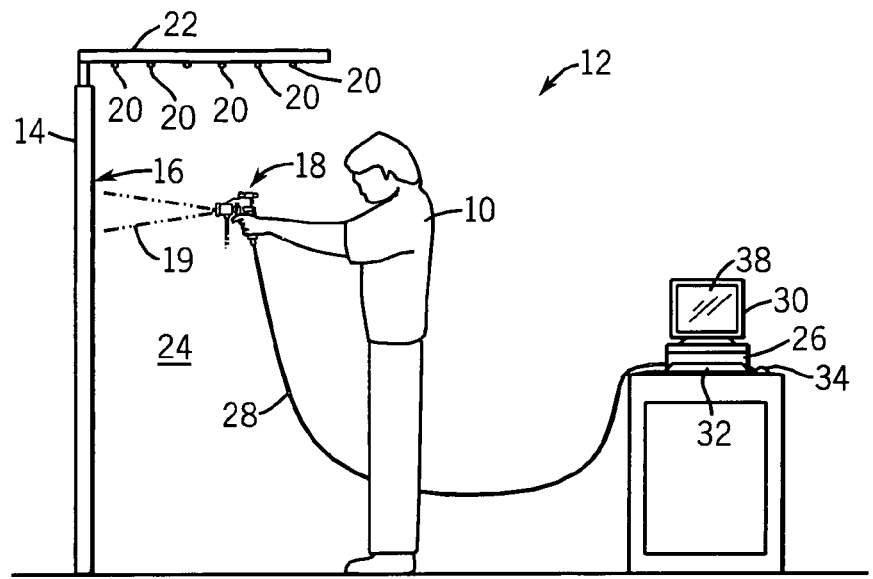
FIG. 1 is a schematic drawing illustrating a person using a virtual coatings application system in accordance with the invention.

FIG. 1 shows a person 10 using a virtual coatings application system 12 in accordance with the invention. The virtual coatings application system 12 is intended to be used to teach painting techniques by allowing the user 10 to repeat the painting process an unlimited amount of times without any part preparation or paint mixing. The system 12 helps painters learn the best approach for painting a part, and can be used to screen potential painters for general skills and abilities. By using the virtual coatings application system 12 as part of the normal training routine, a user can gain valuable experience and sharpen their painting technique without even preparing a part for painting, mixing paint, or cleaning up equipment. The system 12 works well for beginner painters as well as experienced painters.

The virtual coatings application system 12 includes a display screen 14, preferably on a large projection screen television although other types of display screens can be used. A 72" screen (measured on the diagonal) provides a suitable amount of virtual work area, although an 86" screen is preferred. The system 12 defines a virtual surface on the front surface 16 of the display screen. The user 10 is holding an instrumented spray gun controller 18, and is operating the controller 18 to apply a virtual coating or layers of coatings to the virtual surface defined on the screen surface 16. FIG. 1 shows a virtual spray 19 being applied to the virtual surface on the screen surface 16. Note that the virtual spray 19 is imaginary.

The position and orientation of the spray gun controller 18 is monitored using a tracking system, preferably a six degree of freedom tracking system that monitors translation in the x, y and z direction, as well as pitch, yaw and roll. The preferred tracking system is a hybrid inertial and ultrasonic tracking system, as described in more detail hereinafter, although many aspects of the invention may be implemented using other types of tracking technologies. The preferred inertial and ultrasonic tracking system is desired because it minimizes electrical interference present with other types of commercially available tracking systems. FIG. 1 schematically depicts an arrangement of ultrasonic transmitters 20 which are mounted to a frame 22 extending over the space in front the virtual surface 16. The space in front of the virtual surface 16 is referred to herein as the virtual workspace 24.

The instrumented spray gun controller 18 is connected to a computer 26 preferably via a USB cable connection 28. A monitor 30, keyboard 32 and mouse 34 are connected to the computer 26, as well as one or more loudspeakers 36. The virtual coatings application system 12 includes a graphical user interface 38 that is displayed on the computer monitor 30.

Figure 2:
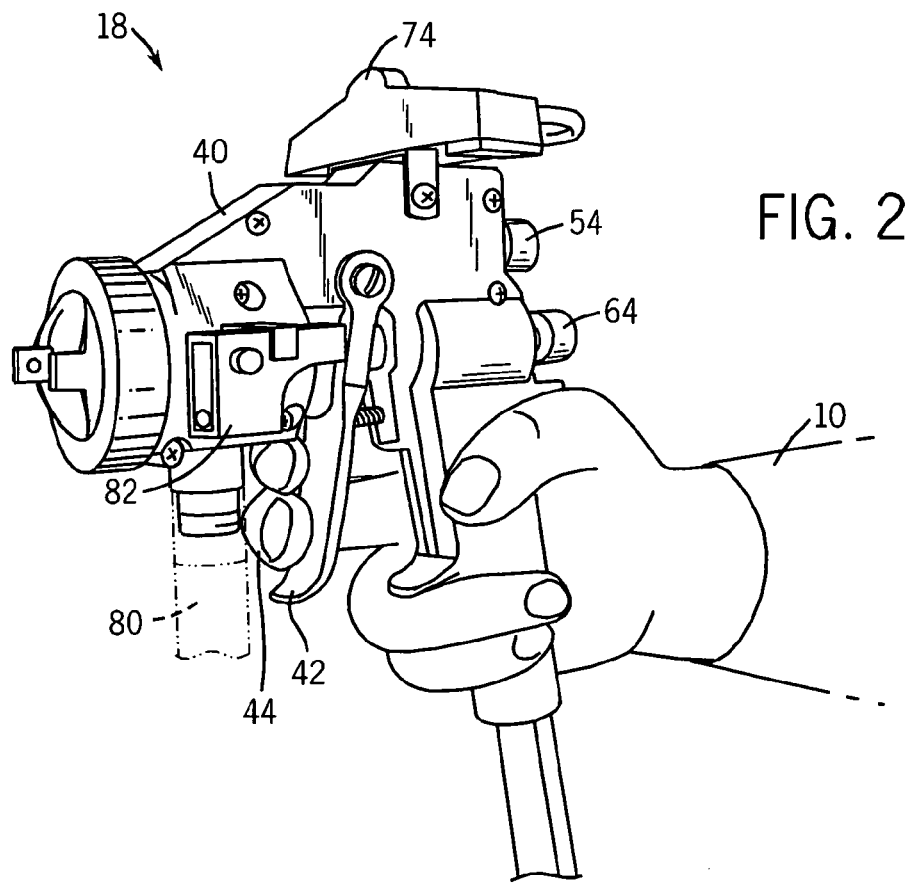
FIG. 2 is a schematic drawing illustrating a preferred embodiment of an instrumented spray gun controller used to simulate a typical high volume low pressure spray gun in accordance with the invention.
Figure 3:
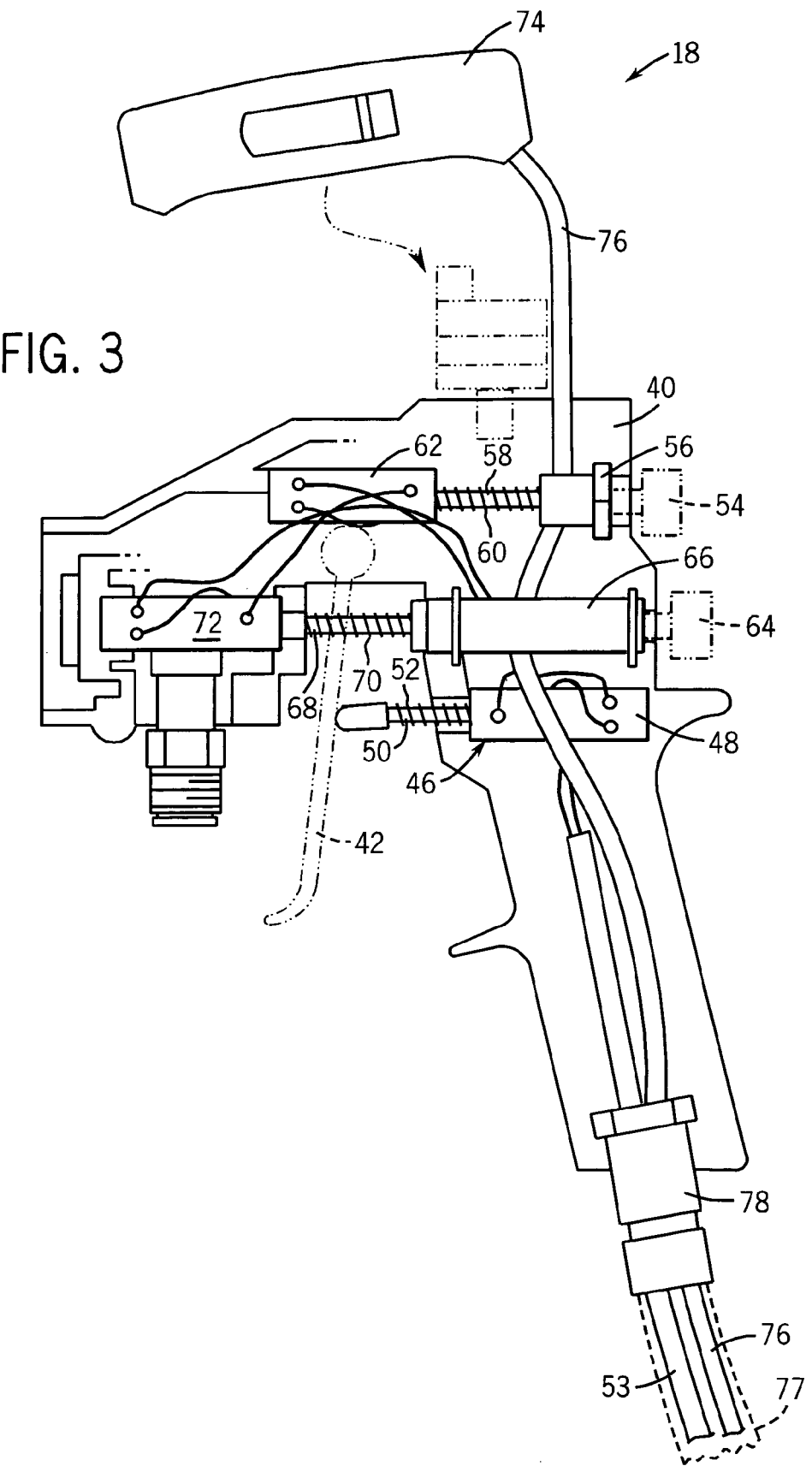
FIG. 3 is a cross-sectional view of the spray gun controller shown in FIG. 2 partially assembled.

FIGS. 2 and 3 show the preferred instrumented spray gun controller 18 in detail. The controller 18 is an actual high volume low pressure spray gun that has been instrumented with electronic sensors in order to provide a realistic interactive experience for the person 10 using the controller 18. The controller 18 includes a housing 40 which has been machined or otherwise formed to accommodate the electrical components of the controller 18. The controller 18 has a trigger 42 that is variably positionable in response to pressure applied by the fingers 44 of the user 10. The position of the trigger 42 is sensed by position sensor 46. The trigger position sensor 46 is a potentiometer 48 that senses the tension on spring 50 located on rod 52 and outputs a signal representing trigger position data. The signal is transmitted to the computer 26 via wires in cable 53 (which lead to the USB connection 28). The computer 26 monitors the signal from the potentiometer 48 every timing cycle to detect the position of the trigger 42. As discussed in more detail hereinafter, use of the trigger sensor 46 to detect the variable position of the trigger 44 allows for the user 10 to realistically apply a partial spray to the virtual surface on the display screen 16. For example, the user 10 can move the spray gun controller 18 very close to the virtual surface 16 (i.e. two to four inches) and apply a small virtual spray to virtual surface on the display screen 16.

The instrumented spray gun controller 18 also includes a flow rate control knob 54. The user 10 turns the flow rate control knob 54 to adjust the maximum virtual flow rate for the spray gun controller 18. In actual high volume low pressure spray guns a needle valve is typically used to adjust fluid pressure and hence fluid flow rate. In FIG. 3, head of knob 54 is shown in phantom. FIG. 3 also shows a bushing 56 that receives the knob 54, and a rod 58 and spring 60 leading from the bushing 56 to potentiometer 62. The potentiometer 62, or sensor 62, senses the position of the flow rate knob 54 and generates a signal representing maximum virtual fluid flow rate which is sent via wires in cable 53 to the computer 26. The maximum virtual flow rate is used by simulation software in the computer 26 to scale the trigger position data. The maximum virtual flow rate can also be adjusted using the graphical user interface 38, see FIG. 5. In many high volume low pressure spray guns, adjustment of the flow rate knob 54 also restricts the range of motion of the trigger. The instrumented spray gun controller 18 may include this feature as well to best simulate actual usage in the field.

The spray gun controller 18 also includes a fan size adjustment knob 64, FIG. 2. The user can rotate the fan size adjustment knob 64 to adjust the fan size of the virtual spray 19, in a manner similar to that on an actual high volume low pressure spray gun. In FIG. 3, the head of the fan size control knob 64 is shown in phantom. The fan size control knob 64 screws into a bushing 66 that is mounted inside the spray gun controller housing 40. A rod and spring mechanism 68, 70 leads from the bushing 66 to a sensor or potentiometer 72. The stem of the fan size control knob 64 pushes on the rod 68 and the potentiometer 72 monitors the tension on the spring 70 in order to detect the desired fan size for the virtual spray 19. The fan size can also be adjusted on the graphical user interface 38, see FIG. 5. A signal generated by potentiometer 72 is sent through wires in cable 53 to the computer 26.

As mentioned above, the preferred spray gun controller 18 is also instrumented with a hybrid inertial and ultrasonic sensor 74, which is mounted to the top surface of the controller 18. The preferred inertial and ultrasonic sensor 54 is supplied along with the other components of the tracking system from Intersense, Inc. of Bedford, Mass. The preferred sensor is the Intersense IS-900 PC Tracker device. The sensor includes accelerometers and gyroscopes for inertial measurement and a microphone for measuring ultrasonic signals from the beacon of ultrasonic transmitters 20, FIG. 1. The preferred arrangement of ultrasonic transmitters consists of a SoniFrame™ emitter with two six-foot SoniStrips™ and one four foot SoniStrip™ from InterSense, and provides a tracking volume of approximately 2.0 m×2.0 m×3.0 m for the virtual work space 24. The tracking system uses hybrid inertial and ultrasonic tracking technologies substantially disclosed in U.S. Pat. No. 6,176,837, which is incorporated by reference herein. The ultrasonic transmitters 20 receive timing signals from tracking software in the computer 26. The sensor microphone detects high frequency signals from the ultrasonic transmitters, and the sensor accelerometers and gyroscope devices generate inertial position and orientation data. As mentioned, inertial measurements provide smooth and responsive sensing of motion, but accumulation of noise in these signals can cause drift. The ultrasonic measurements are used to correct such drift. The sensor 74 located on the spray gun controller 18 outputs a six degree of freedom signal, namely x, y, z for linear directions and pitch, yaw and roll for angular directions. The signals from the sensor 74 are transmitted through a cable 76 which is fed through the controller housing 40 and exits the bottom of the housing 40 through busing 78 similar to cable 53. Cable 76 along with cable 53 are sent to the computer 26, preferably using the previously described USB cable connection 28. The position and orientation of the sensor 74 is determined based on software in the computer 26, thus determining the position and orientation of the spray gun controller 18 in the virtual work space 24 in front of the display screen surface 16. While it is possible for the connections from the spray gun controller 18 to the computer 26 to be wireless connections, it is preferred to use an actual hose 78 to house the cables 54 and 76 in order to simulate a compressed air hose feeding an actual spray gun. In a similar manner, a hose 80 can be mounted to a bushing 82 on the underside of the spray gun controller 18 that would normally accept a tube that supplies the material being supplied to the spray gun, or alternatively a container could be attached to simulate spray guns which store paint in a container.

Those skilled in the art will recognize that the spray gun controller 18 allows the user 10 to make the typical adjustments that would be made using a high volume low pressure spray gun in the field.

FIG. 2 also shows a laser targeting and positioning system 82 mounted to the housing 40 of the spray gun controller 18. In fact, the laser or light beam targeting and positioning system 82 are used in a reverse projection display method. Actual laser guide systems as described in previously mentioned U.S. Pat. Nos. 5,598,972, 5,857,625 and 5,868,840, incorporated herein by reference, use a reference light beam projecting forward from the spray gun onto the surface being painted and a non-parallel guide beam which also projects onto the surface being painted. The user of the spray gun aims the center of the spray at the spot illuminated by the reference beam, and determines whether the spray gun is at the appropriate orientation and standoff distance from the surface using both illuminated points and determining whether the points have converged or are aligned. In one method of projection, such as with a television monitor, software within the computer 26 models the illumination of the points for the laser or light beam targeting and positioning system on the virtual surface 16.

FIG. 4 is an overall block diagram showing components of the virtual coatings applications system 12 and the flow of information between the various components. Software for the virtual applications coating system 12 operating on the computer 26, FIG. 4, controls the operation of the system 12. Block 84 in FIG. 4 depicts the tracking software loaded on the computer 26. The preferred tracking software, as mentioned earlier, is provided by Intersense, Inc. of Bedford, Mass. The tracking software outputs signals to the ultrasonic beacons 20 as shown by line 86. The ultrasonic beacons transmit ultrasonic signals that are detected by the sensor element 74 on the instrumented spray gun controller 18. The sensor element 74, as mentioned previously, also includes inertial sensor elements. The instrumented spray gun controller 18, and in particular the tracking sensor element, sends six degree of freedom tracking data to the tracking software via line 76. The Intersense tracking system has a positional resolution of 0.75 millimeters and an orientation resolution of 0.05°, a static accuracy for position RMS of 2.0 to 3.0 millimeters and static accuracy for orientation RMS of 0.25° for pitch and roll, and 0.50° for yaw. The interface update rate is 100-130 Hz, and the minimum latency is 4 milliseconds typical.

Based on the six degree of freedom signal that is transmitted to the tracking software via line 76, the tracking software 84 outputs position and orientation data to the simulation software 88. As described in more detail in U.S. Pat. No. 6,176,837, incorporated herein by reference, the tracking software 84 determines the position and orientation data with advanced Kalman filter algorithms that combine the output of the inertial sensors with range measurements obtained from the ultrasonic components. Arrow 90 depicts the six degree of freedom position and orientation data being sent from the tracking software 84 to the simulation software 88. The simulation software 88 also receives the information, arrow 53, directly from the instrumented spray gun 18 as well as information from the graphical user interface 38, see arrow 92. Generally speaking, the simulation software 88 feeds calculated information to a performance database 94, arrow 96, and to graphic engine software 98, arrow 100. In practice, the preferred system 12 actually involves several separate flows of information from the simulation software 88 to the graphical engine software 98 and the performance database 94. The graphic engine software 98 outputs data that drives images on the projection screen 14 (depicted by arrow 102) as well as data that drives loudspeakers 36 (depicted by arrow 104).

Figure 4A:
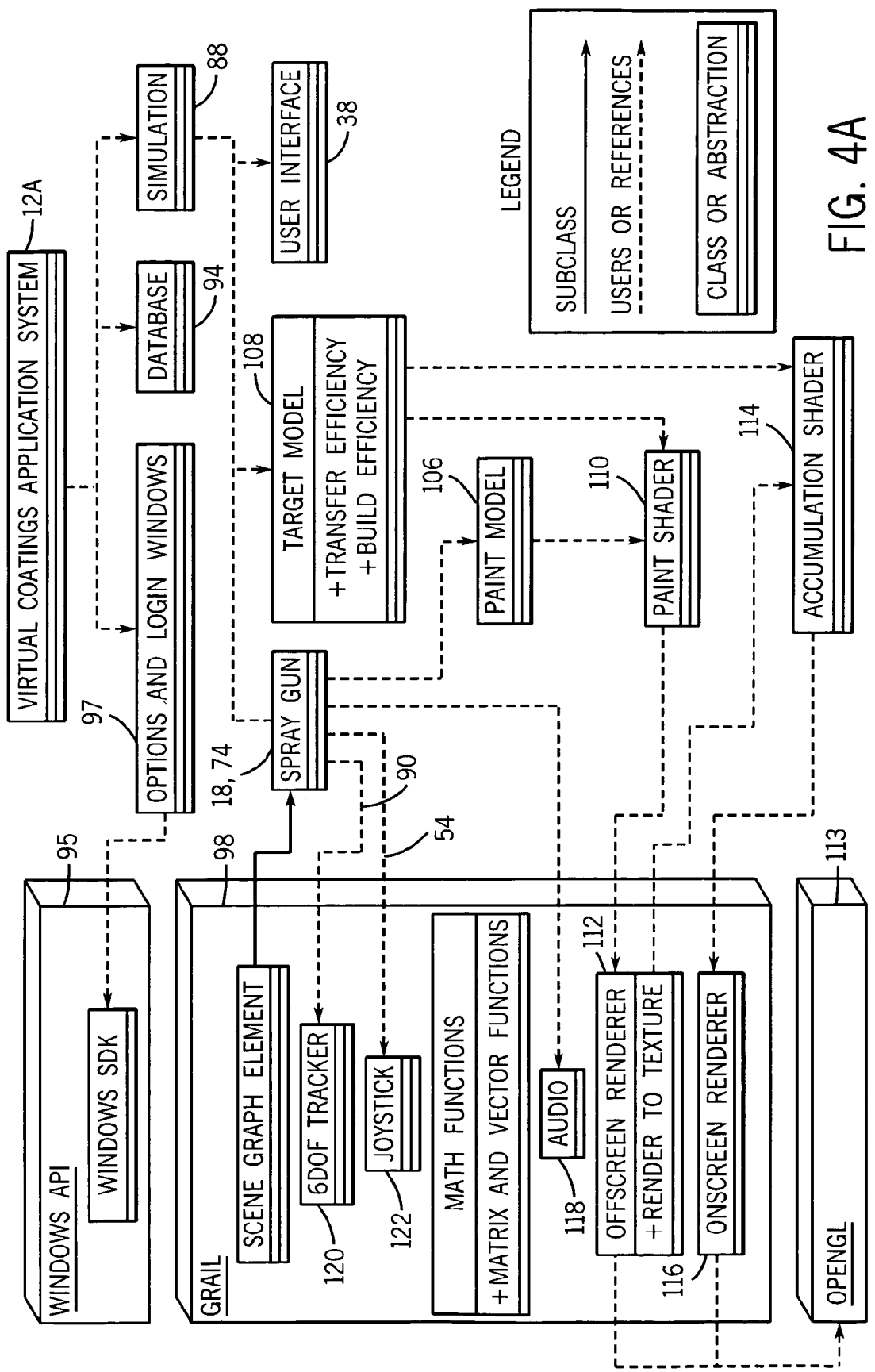
FIG. 4A is a diagram illustrating the software architecture of the system.

FIG. 4a depicts the software architecture of the system 12a. Referring to FIG. 4a, when the user 10 launches the virtual coatings application system software on the computer 26, the Windows® application programming interface 95 is launched to run the application software. Preferably, the user is required to login 97 before using the system. The system 12a generates a student performance data file for each student that has logged in on the system, and these student data files are stored as part of the performance database 94. Once the user 10 is logged in, the graphical user interface 38 appears on the computer screen 30, and performance data for that session specific to the student is read from and written to the student data file and displayed on the computer screen 30 for the graphical user interface 38.

Still referring to FIG. 4a, the simulation software 88 includes a paint model 106 that models the amount and pattern of paint virtually deposited on the virtual surface for a slice of time as will be discussed in more detail below. The simulation software 88 also includes a target model 108 which models a two-dimensional image to be displayed on projection screen 16 as the virtual surface of the part being painted. Preferably, the models for the virtual painting surfaces are supplied in the 3-D Studio Max (3DS) format. For two-dimensional images, the models are flat along the z axis. Software can be developed for this application in the C++ programming language using Microsoft® Visual Studio®.

FIG. 4a shows the information from the paint model 106 and the target model 108 are sent to a paint shader module 110. The paint shader module 110 determines whether the pattern of virtual spray paint output by the paint model 106 for that timing cycle hits the surface of the two-dimensional image (i.e., hits the virtual surface) that is modeled by the target model 108. If not, as mentioned, the software has the capability of illustrating paint overspray in a color different from the selected paint color. This information is also used to monitor performance. Output from the paint shader module 110 is sent to the graphics engine 98. The preferred graphics engine is a scene graph base rendering engine, and in particular, the GraIL™ graphics engine developed by and available from Southwest Research Institute, San Antonio, Tex. The output from the paint shader module 110 to the graphics engine software 98 is inputted to the off-screen renderer 112. The off-screen renderer 112 generates an image of just the paint. The off-screen renderer 112 sends data to the open graphics library 113 which is part of the operating system and the industry standard application program interface for defining two-dimensional and three-dimensional images. The OpenGL software is provided by Microsoft free of charge. The off-screen renderer also supplies information to an accumulation shader module 114. The accumulation shader module 114 receives information from the target model 108 as well. The accumulation shader module 114 outputs information to the onscreen renderer 116 within the graphics engine software 98. The onscreen renderer 116 draws the target (i.e., the virtual surface) with virtual paint on it. The onscreen renderer is GraIL's normal render path. The onscreen renderer 116 outputs to the open graphics library 113 which controls the display on the projection screen 14.

The graphics engine 98 also includes an audio component 118. The spray gun controller 18 uses the audio component 118 to load and play audio. In addition, the graphics engine 98 preferably includes support for the six degree of freedom tracking system as depicted by box 120, and support for receiving data regarding the settings and trigger position on the spray gun controller is depicted by box 122. In addition, the graphics engine software 98 includes matrix and vector libraries that are used to calculate positions, orientations, model transformations, intersections, projections, formats and other such datum.

Figure 5:
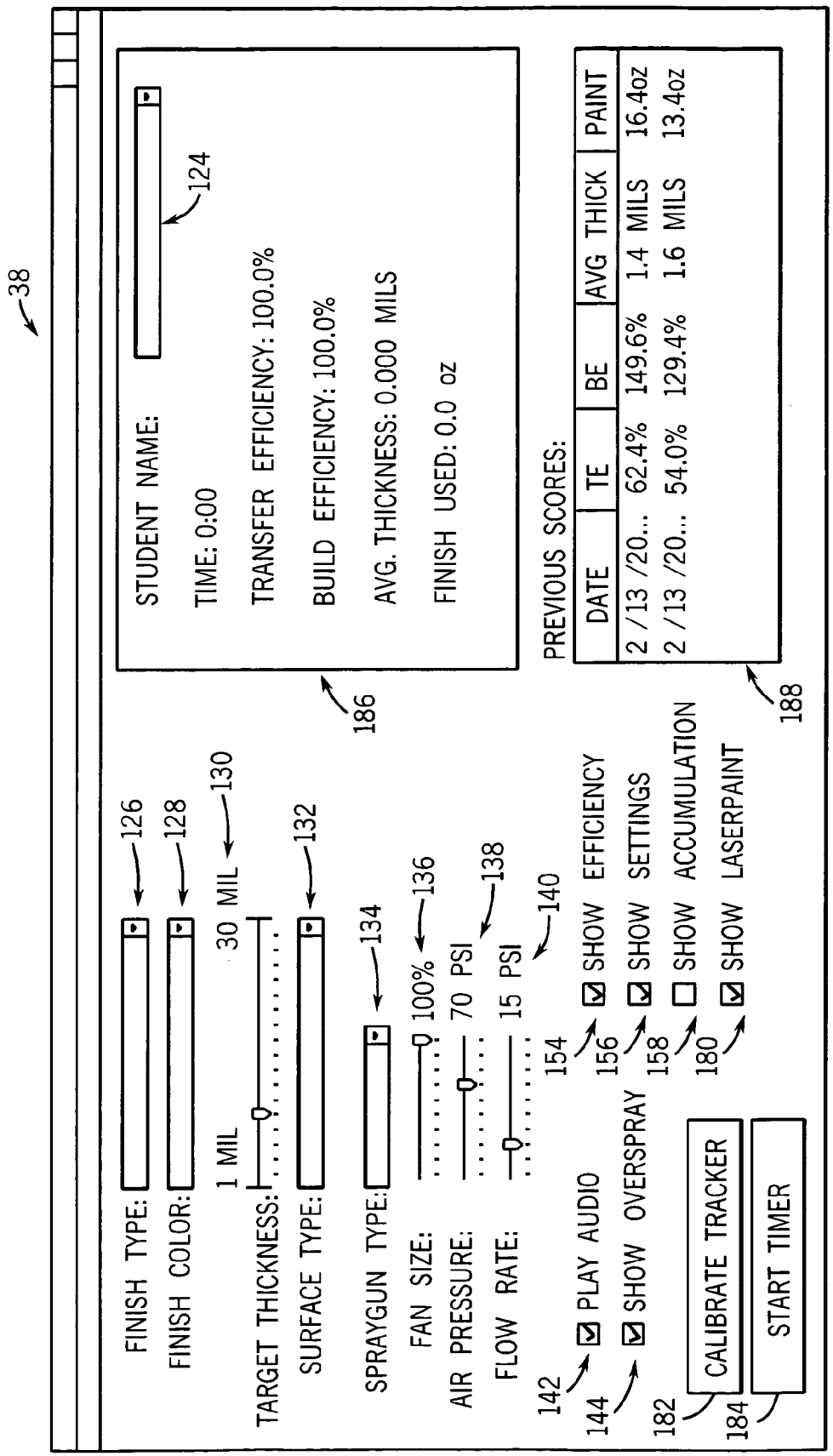
FIG. 5 illustrates a preferred embodiment of a graphical user interface for a virtual coatings application system in accordance with the invention.
Figure 8:
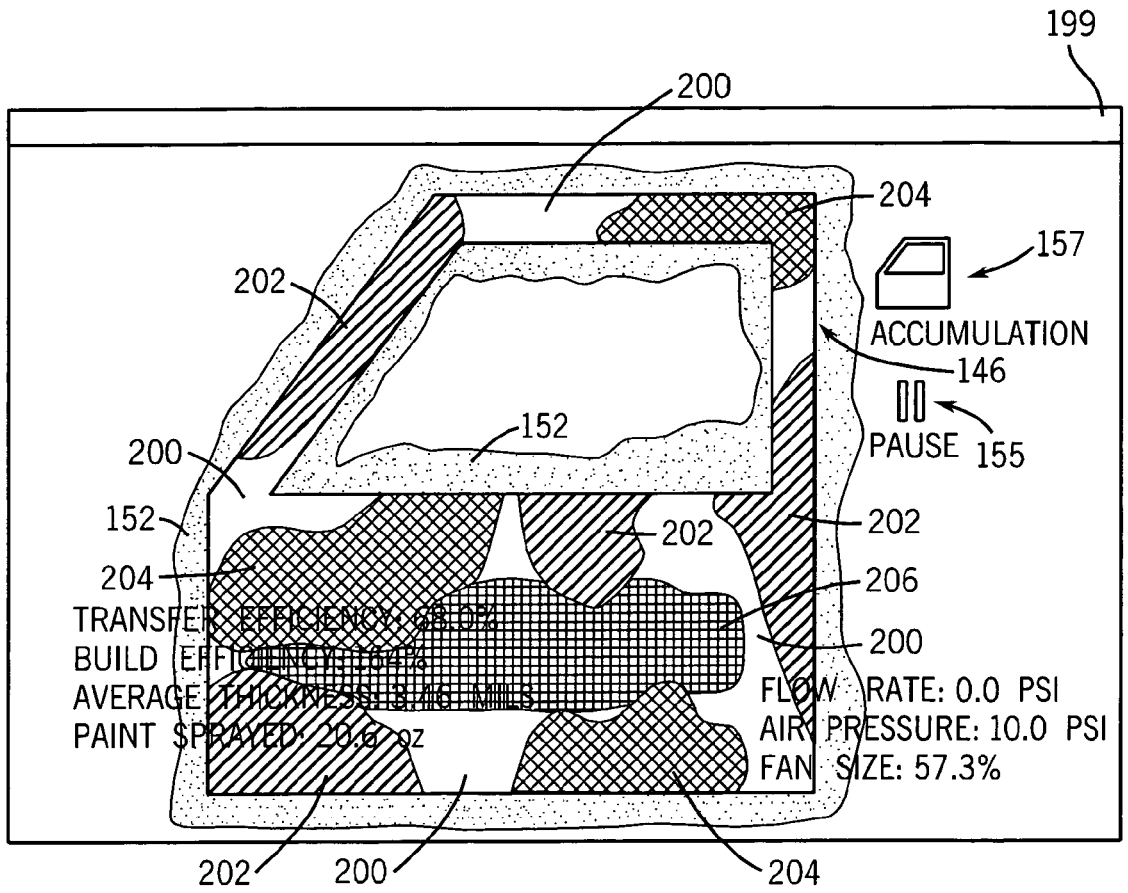
FIG. 8 is a view similar to FIG. 6 wherein the user has elected to change the color of the finish during the training session, thus virtually painting a camouflage design on the image of the door.

Referring now to FIG. 5, the preferred graphical user interface 38 prompts the user to login (see login box 124) in order to start the training session. The user is also required to select certain training set-up parameters such as finish type 126, finish color 128, target thickness 130 (slide preferably 1 mil. to 20 mil.), surface type 132. The interface 38 also requires the user to select settings for the instrumented spray gun controller 18 such as spray gun type 134, fan size 136, air pressure 138 and flow rate 140. Note that the user is allowed to adjust fan size 136 and flow rate 140 on the instrumented gun controller 18 as well using knobs 54, 64. Also, as discussed more specifically with respect to FIG. 8, the user is allowed to change the finish color during the middle of a session. This can be useful, for example, when the user desires to virtually paint an undercoat using a first color (e.g. white) then paint an overcoat in a second color (e.g. blue), or as mentioned previously to virtually paint a coat with multiple colors. Referring briefly to FIG. 8, a window 199 on the projection screen display 16 depicts the virtual surface 146 in the form of a door. The door 146 has been virtually painted using different finish colors to develop a camouflage pattern. Color 200 is the original color on the door 146. Regions 202, 204, 206 depict paint colors that have been chosen by the user during the course of the training session.

Although not specifically shown in the drawings, it may be desirable for the software to provide one or more electronic stencils. If the system incorporates this feature, the user can select one or more of the stencils to overlay the virtual surface being painted, thereby blocking accumulation of the paint over the respective area. Regions 152 depict overspray, as described below in connection with FIG. 6. Note that the overspray 152 is depicted in a color different than the original color 200 or the paint colors 202, 204, 206 selected by the user.

Figure 6:
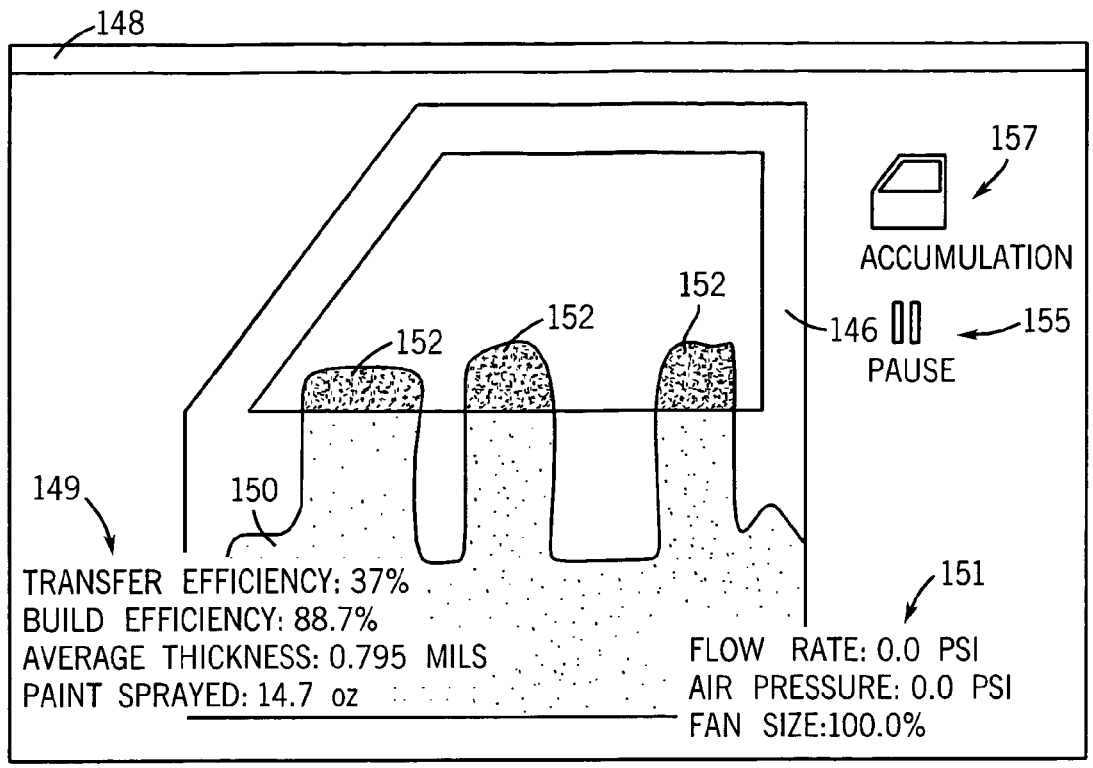
FIG. 6 depicts a two-dimensional image of a door defining a virtual surface on the projection screen, wherein overspray is depicted in a color distinct from the color of virtual painted sprayed onto the image of the door.

Box 144 in FIG. 5 entitled "Show Overspray" enables the user to choose whether or not virtual overspray is indicated on the projection screen 16. Referring to FIG. 6, the virtual surface of a two-dimensional image 146 is shown in a window 148 displayed on projection screen 16. The virtual surface 146 shown in FIG. 6 is a two-dimensional view of a truck door. Typically, the initial color of the door is a solid color such as white or brown before the user begins virtually painting the virtual surface during the training session. Using the spray gun controller 18, the user virtually applies paint to the part 146. The accumulated paint on the door is depicted by region 150. Regions labeled 152 in FIG. 6 depict overspray, that is, regions in which the spray pattern missed the part 146 being virtually painted. When the user chooses to show overspray on the display window 148 by checking box 144 on the graphical user interface 138 (FIG. 5), overspray (regions 152) is displayed as well as accumulation (region 150) on the virtual surface of the part 146. Preferably, overspray 152 is depicted in a color different than the color of the initial part 146 and different than the color of accumulated paint 150 on the part.

The graphical user interface 38 also includes several toggle switches. Toggle box 142 labeled "Play Audio" allows the user to determine whether the simulation will include simulated air compressor noise in accordance with data from the audio component 118 in the simulation software. In this regard, the system 12 includes one or more speakers 36 and the software interactively generates an output sound signal in response to whether the trigger sensor 48 on the spray gun controller 18 has been activated. The output sound signal is provided in real time to drive the one or more loudspeakers to simulate the sound of compressed air coming from the spray gun controller 18. The simulation software includes digital sound files of actual compressed air noise recordings. It has been found that the volume of the compressed air varies proportionately to the air pressure of the compressed air supplied to the spray guns in the field. Therefore, the software controls the volume of the sound generated by the loudspeakers 36 in accordance with the air pressure setting 138 on the graphical user interface 38.

Figure 7:
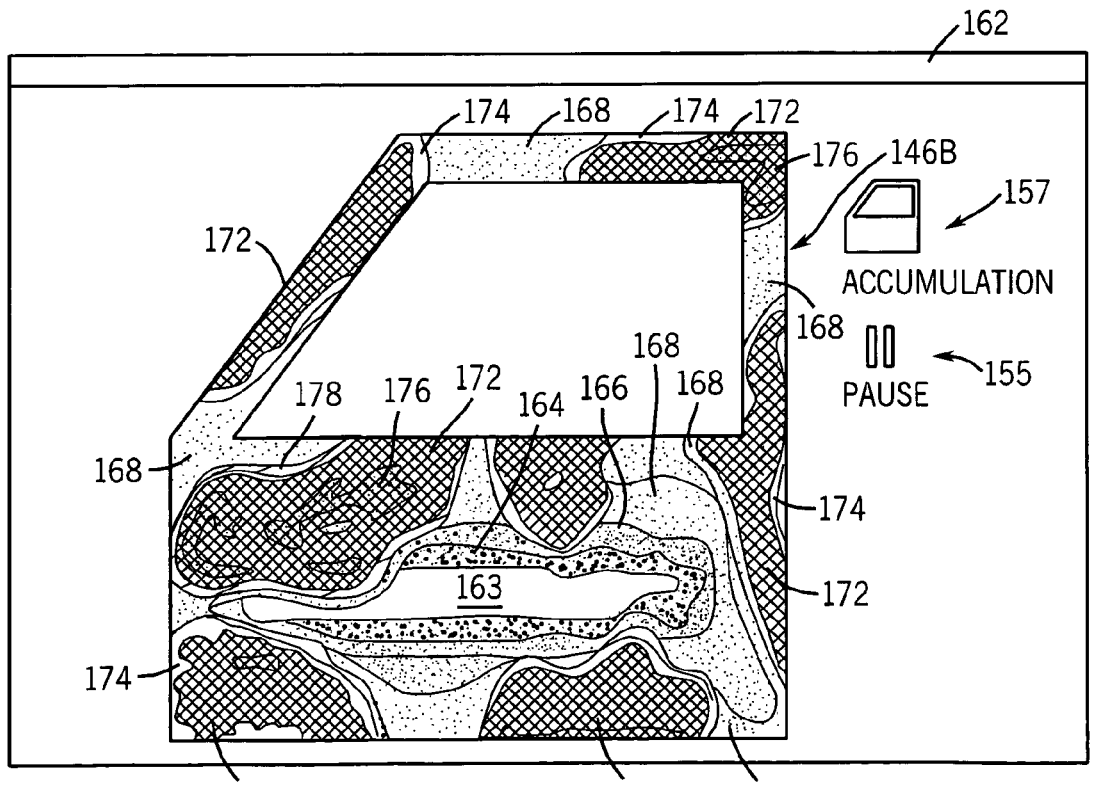
FIG. 7 is a view similar to FIG. 6 wherein build thickness of the finish accumulated on the image of the door is depicted in multiple colors.

The box 154 entitled "Show Efficiency" enables the user to choose whether certain performance data for the session such as transfer efficiency, build efficiency, average thickness, and amount of paint sprayed are displayed on the projection screen 16 along with the virtual images. Box 156 entitled "Show Settings", likewise, allows the user to choose whether current controller settings are displayed on the projection screen 16, such as maximum flow rate, air pressure and fan size. Referring to FIG. 6, arrow 149 indicates the display of performance data including values for transfer efficiency, build efficiency, average thickness and amount of paint sprayed for the training session. Arrow 151, on the other hand, indicates display of the current spray gun controller settings, namely flow rate, air pressure and fan size. Having this information 149, 151 displayed on the projection screen 16 puts this information within the scope of vision of the user and provides immediate feedback in a non-distracting manner. Note that it is preferred to allow the user to select whether the information 149, 151 is displayed on the projection screen 16. FIGS. 7 and 8 illustrate situations in which the information is not displayed in that manner.

Box 158 in FIG. 5 entitled "Show Accumulation" allows the user to choose whether accumulated build thickness is displayed in single color mode or in a multiple color accumulation mode. Multiple color accumulation mode is illustrated in FIG. 7. Referring to FIG. 7, the virtual work surface 146B of a door is displayed in the window 162 opened on the projection screen 16. The virtual work surface 146B has been virtually painted at least partially, and accumulation levels both above and below the target thickness are shown by multiple colors. Region 163 in FIG. 7 represents an unpainted region on the door 146B. The remainder of the door has been virtually painted, and build thickness is indicated over surface of the door by the various different colors 164, 166, 168, 170, 172, 174 and 176. Each color represents a build thickness being within a certain defined range for that color, thus illustrating the topography of accumulated paint thickness. When in accumulation display mode in the preferred system, the surface color 163 is used to represent an area with no paint. Shades of blue represent paint thickness under the target thickness by more than ½ mil, shades of green are used to represent value within 1 mil of the target thickness, and shades of red represent thickness levels that exceed the target by more than ½ mil. The accumulation display is created using the accumulation shader 114, FIG. 4a. The accumulation shader is a *.cg file. Note that the user can virtually paint the part 146B on the projection screen surface 16 without being in accumulation mode, and can then change the settings to show accumulation display mode on the projection display 16. Note also that overspray is not depicted in FIG. 7, although it is of course possible to depict overspray while in the accumulation display mode.

Referring now generally to FIGS. 6, 7 and 8, the windows 148, 162, 199 opened on the projection screen surface 16 included one or more icons 155, 157 that are set apart from the image of the virtual surface 146, 146b being painted. The icons 155, 157 can be activated by the user by pointing the controller 18 at the icon 155 or 157 on the screen 16 and pulling the trigger on the controller 18. These icons 155, 157 are typically always present when a window 148, 162, 199 is opened. Icon 155 is a pause icon which the user can activate in order to pause the training session. Icon 157 is a toggle for the accumulation display mode. It is possible in accordance with the invention to include other or additional toggle icons on the screen 16.

Referring again to FIG. 5, box 180 entitled "Show Laser-Paint" on the user interface 38 enables the user to select whether the simulation software should model a light or laser targeting and positioning system by illuminating two dots on the screen 16, thus helping the user position the spray on the virtual surface and maintain the spray gun controller 18 at the appropriate distance from the virtual surface and at the appropriate orientation. Preferably, the software generates data to illuminate an image on the projection screen 16 simulating a reference beam hitting a painted surface as well as the image on the display screen of the gauge beam illuminating a spot on the surface. The image for the reference beam is preferably set to be in the center of the virtual spray pattern whereas the image for the gauge beam depends on the standoff distance and orientation of the spray gun controller 18 with respect to the screen surface 14 on which the virtual surface 16 is displayed. Preferably, the image of the reference beam and the image of the gauge beam will converge to a single point at the middle of the spray pattern when the spray gun controller 18 is located at the appropriate distance and orientation with respect to the virtual surface 16 defined by the display screen 14. However, the image of the gauge beam on the display screen 14 will depart from the image for the reference beam if the gun controller 18 is moved too far or too close to the surface 16 or tilted inappropriately. Since the standoff distance between the spray gun controller 18 and the display screen 14 is known by the tracking system, as well as the offset between the sources of the imaginary reference beam and the imaginary gauge beam and the angle of incident of the imaginary gauge beam with respect to the imaginary reference beam (via settings on the mocked-up laser guide, or assumed default settings), the system can easily calculate the location of the illuminated images for the imaginary reference beam and the imaginary gauge beam on the surface 16 using fundamental trigonometric expressions.

The graphical user interface 38 in FIG. 5 also includes a button to activate calibration of the tracking system 180 and another button that the user can click to start the timer for the training session 184.

In addition, as previously mentioned, the graphical user interface 38 shown in FIG. 5 displays one or more performance monitoring statistics for the current training session, as well as data summaries for previous training sessions. Note that the display box 186 displays the following information for the current training session: time of the training session, transfer efficiency, build efficiency, average build thickness, and total finish used. Preferably, average build thickness is displayed in an alternative color (such as red) when the value for a session exceeds the target thickness selected using the slide 130 on the graphical user interface 38. This occurs both on the graphical user interface 38 and the display surface 16. The performance computations are based on the position and angle of the spray gun controller 18, and preferably includes the effects of both "shear effect" which in the painting trade is commonly called "bounceback" and overspray which simply misses the part. The effects of bounceback are described hereinafter with respect to FIG. 9. Transfer efficiency is calculated using the following formula:

Transfer Efficiency=Mass of Finish Deposited÷Mass of Finish Sprayed×100 (Eq. 1)

Build efficiency is calculated using the following formula:

Build Efficiency=Average Mils Applied×Area Sprayed÷Mass of Finish Sprayed×100 (Eq. 2)

For both of these equations, the mass of finish sprayed is determined for each timing cycle in relation to the setting for the maximum virtual flow rate by prompt 140 on the graphical user interface 138 or the flow control knob 54 on the spray gun controller 18, as well as the position of the trigger 42 on the spray gun controller 18. Transfer efficiency is a measure of the amount of finish that is actually transferred or deposited on the virtual part in relation to the total amount of finish sprayed. The mass of finish deposited is calculated by totaling or accumulating the mass of all of the virtual paint that is accumulated on the virtual part on the screen. The build efficiency (BE) is the measure of how close and consistent the actual film applied to a part is to the desired dry film thickness. A BE of 100 percent is perfect: values greater than 100 percent represent wasted coatings and excessive emissions of Volatile Organic Compounds (VOC's), Hazardous Air Pollutants (HAP'S) and increased production costs. For example, if the target dry film build for a part is 1 mil and 1.25 mils are actually applied to the part (at a TE of 100 percent), the BE would be 125 percent, which is 25 percent more paint used and emissions then are necessary.

Box 188 on graphical user interface 38 in FIG. 5 shows summaries of previous performance scores for the logged-in user. This performance data is stored and recalled using the performance database 94, as previously discussed.

The graphical user interface 38 can also include drop down menus such as drop down menus labeled "File", "Display" and "Tools". Under the drop down menu for "File", the preferred system includes a restart command which restarts the training session and reset all the performance data, a save to database command which saves the current student scores to the database, a save as file command which saves the current user scores to a specified file, and an exit command which exits from the VCAS application. The "Display" drop down menu preferably includes a show gun setting command which toggles the display of the controller settings on the display surface 16, a show efficiency data command which toggles the display for efficiency data on the screen, a play sounds command which toggles the spray gun sound cues, a show overspray command which toggles the display of overspray on the display, a show accumulation command which toggles the accumulation display mode on the display, and a show laser command which toggles the display of the simulated laser paint dots on the display. The "Tools" menu preferably includes a calibrate tracker command which starts a tracker calibration mode.

The paint model 106 in the simulation software simulates the flow and transfer of finishing material (e.g. paint) based on standoff distance and angle of the spray gun controller 18 relative to the virtual surface, fluid flow rate, air pressure and fan size. To do this, it is necessary to model the amount of virtual paint flow through the spray gun controller. Table 1 lists empirically obtained data regarding fluid flow rate (ounces per second) for a high volume low pressure spray gun as simulated in FIGS. 2 and 3. The data in Table 1 is for an aliphatic polyurethane CARC 1.5 VOC MIL-C-53039A with a density of 1.4379 grams per milliliter and a weight of 12.0 pounds per gallon.

TABLE 1

| Atomizing Air | Fluid Pressure | Ounces/Sec |
|---|---|---|
| 0 | 5 lbs | 0.02304 |
| 10 | 5 lbs | 0.01664 |
| 50 | 5 lbs | 0.00896 |
| 100 | 5 lbs | 0.00128 |
| 0 | 10 lbs | 0.07936 |
| 10 | 10 lbs | 0.0704 |
| 50 | 10 lbs | 0.05504 |
| 100 | 10 lbs | 0.04096 |
| 0 | 20 lbs | 0.20352 |
| 10 | 20 lbs | 0.19584 |
| 50 | 20 lbs | 0.17664 |
| 100 | 20 lbs | 0.15616 |
| 0 | 40 lbs | 0.4352 |
| 10 | 40 lbs | 0.4224 |
| 50 | 40 lbs | 0.40192 |
| 100 | 40 lbs | 0.3712 |
| 0 | 60 lbs | 0.6656 |
| 10 | 60 lbs | 0.6656 |
| 50 | 60 lbs | 0.64128 |
| 100 | 60 lbs | 0.59648 |

For each timing cycle, the mass of finish sprayed is determined using the value in Table 1 and interpolating for the current fluid and air pressure settings, as well as the trigger position.

Figure 9:
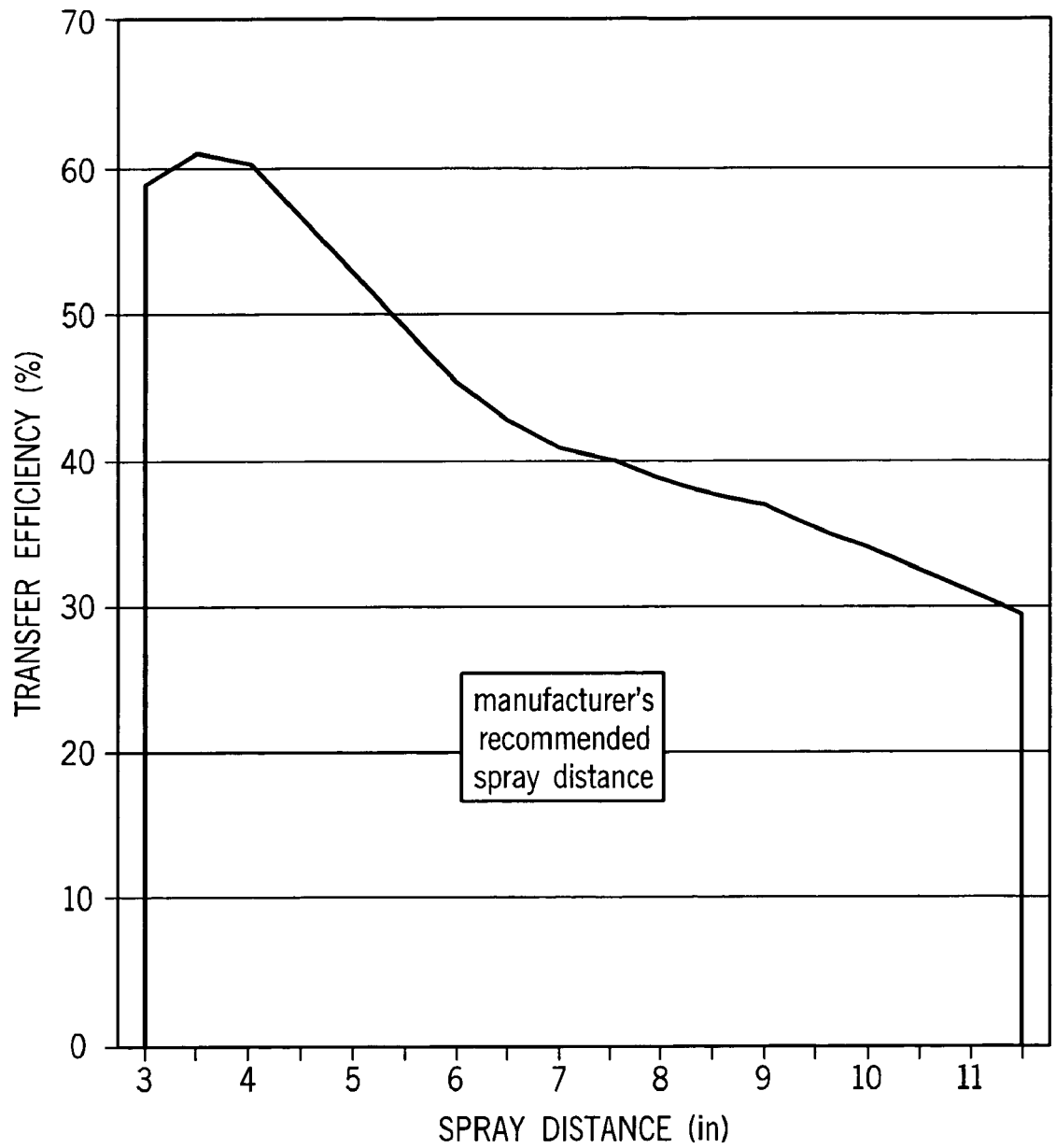
FIG. 9 is a plot illustrating experimentally obtained data for transfer efficiency in terms of spray distance.

Referring now to FIG. 9, the preferred paint model accounts for shear effect, which can be significant in real world spray paint applications, thus contributing to the realism of the simulation. The term "shear effect" relates to the transfer efficiency of paint or finish when the pattern is directed completely onto the surface. Even under such conditions, a significant amount of finish does not transfer onto the surface. FIG. 9 shows a plot in which transfer efficiency is plotted with respect to standoff distance for an actual high volume low pressure spray gun as determined experimentally using a standard barrel test. Note that transfer efficiency is calculated in FIG. 9 as the amount of dry finish on the surface divided by the total mass of the finish sprayed (both solids and solvent). The results of this test show that transfer efficiency is much higher at closer standoff distances than at farther standoff distances. It is possible, although does not appear to be necessary for accurate simulation, to use other parameters besides standoff distance to model the transfer efficiency.

By way of background, solvents are critical in the composition of liquid coatings using high volume low pressure spray gun as well as other types of spray guns. First, the solvent provides the proper viscosity for the liquid coating to be sprayed. Second, the solvents used in liquid coating contribute to the coating's final performance properties. Third, solvent evaporation enables the formation of the coating's film on the substrate to which it is applied. It has been found that spray gun distance is a significant factor in the percentage of solvent evaporating from the coating before the coating droplets reach the target. The solvents are evaporating from the coating droplets "in-flight" to the part. The greater the distance the coating droplets have to travel to the part, the more solvent is evaporated and the coating droplet mass loss is increased. As the coating droplets decrease in mass, the droplets have difficulty penetrating the shear forces generated by the atomizing air, thus decreasing transfer efficiency onto the workpiece surface and increasing overspray. Some in the art believe that an air layer develops adjacent the surface of the work piece, and the paint droplets either pass through the shear layer or are swept away as overspray. Research has shown that increasing the spray distance from the surface of the workpiece, for example from 6" to 12", can reduce transfer efficiency by as much as 50% using high volume low pressure spray guns.

The actual test results shown in FIG. 9 were done using coatings that contained a lower percentage of solids than that of the coatings simulated in the preferred embodiment of the coatings application system 12 described herein. More specifically, the barrel test from which FIG. 9 was derived was based on an automotive coating, namely PPG Deltron® universal base coat. The preferred simulated finish type, however, was a chemical agent resistant coating (CARC). In order to provide the simulation with the appropriate look and feel of a CARC coating, the transfer efficiency curve shown in FIG. 9 was shifted upwardly 30%. Transfer efficiency percentage points can be adjusted to reflect various types of coatings and the solid contents of the coating by manipulation of the software parameters.

Figure 10:
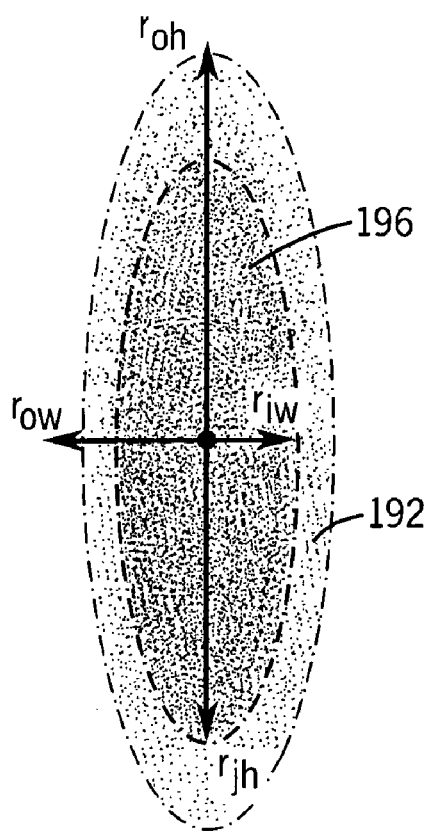
FIG. 10 is a schematic drawing illustrating coverage rate aspects of the preferred paint model

The paint model 106 models the distribution of the deposited finish over a virtual spray pattern based on data collected from spray patterns generated from actual spray guns at various spray gun settings. FIG. 10 illustrates fundamental aspects of this portion of the paint model 106. For an unrotated pattern with any given combination of air pressure, flow rate, fan size, and standoff distance, the preferred paint model 106 includes the following parameters to completely characterize the resulting pattern (see FIG. 10):

1) inner elliptical radii defining the width ($r_{iw}$) and height of ($r_{ih}$) of the area of constant finish coverage;
2) outer elliptical radii defining the width ($r_{ow}$) and height of ($r_{oh}$) of the extent to where finish coverage becomes negligible;
3) uniform coverage per unit time over the area of constant coverage, wherein a value of 1.0 represents complete, ideal coverage;
4) the local density of spatter droplets per square inch per unit time;
5) the minimum spatter droplet size; and
6) the maximum spatter droplet size.

Referring still to FIG. 10, reference number 190 refers to the area of constant finish coverage, and surrounding area 192 refers to the spattered area. The preferred paint model 106 assumes that finish coverage (average density) falls off linearly between the inner and outer radii at all points. Coverage at the outer radius is always equal to zero. The actual distribution is based on a random number generator. The overall pattern dimensions are modified linearly with standoff distance, since the pattern source is assumed to be a point and the model ignores gravity. Coverage rates for uniform spray and for spatter vary inversely with standoff distance; however, spatter size is constant since spatter size is based on droplet volume, which is invariant with respect to standoff distance.

As mentioned, for each timing cycle, the mass of finish sprayed is determined using the values in Table 1 and interpolating for the current fluid pressure and air pressure, as well as the trigger position. The model then uses the determined transfer efficiency (FIG. 9) based on the standoff distance (and optionally tilt) determined by the tracking system 84. Then, the paint model 106 distributes the virtual mass of finish deposited (i.e., mass virtually sprayed scaled by the corresponding transfer efficiency value) over a spray pattern as depicted in FIG. 10 having an inner area of constant finish coverage 190 and an outer spatter area. The inner and outer radii for the pattern ($r_{iw}$, $r_{ow}$, $r_{ih}$, $r_{oh}$) as well as spatter density and size are determined in accordance with an algorithm which models spray pattern data collected for actual high volume low pressure spray gun settings. For a high volume low pressure spray gun, this can be accomplished by painting spray paint patterns onto paper suitable for spray paint training purposes with the spray gun set to various settings for air pressure, fluid pressure and fan size. For example, twenty seven patterns can be made by setting each parameter at a low, medium and high setting, such as air pressure (5 psi, 50 psi, 100 psi), fluid pressure (10 psi, 20 psi, 40 psi), and fan size (closed, half open, 100% open). These patterns should be generated with the spray gun at the recommended distance (e.g., 6" standoff for a high volume low pressure spray gun with the preferred CARC coating), and care should be taken so that the standoff distance does not vary from pattern to pattern, and that the spray direction is orthogonal to the surface. The use of a light beam targeting and positioning system as described in U.S. Pat. Nos. 5,598,972, 5,857,625 and 5,868,840 is quite helpful to ensure consistent orientation and standoff distance among patterns. Preferably, some patterns should be generated with varying spray gun angles as well. Then, the spray patterns are analyzed to determine the inner and outer radii for the pattern ($r_{iw}$, $r_{ow}$, $r_{ih}$, $r_{oh}$) as well as spatter size for the various spray gun settings, and this information is the basis for the spray pattern distribution in the paint model 106. The paint model 106 uses interpolation to accommodate the actual settings for air pressure, fluid pressure (maximum fluid scaled by trigger position) and fan size during operation of the virtual coatings application system 12.

The paint model 106 compensates for the rotation of the spray gun controller 18 by displacing and rotating the coverage pattern and modifying the coverage density according to the collected data. Generally speaking for high volume low pressure spray gun applications, the pattern as a whole exhibits reduced coverage due to pitch and yaw. For pitch and yaw changes through 15 to 20 degrees, the total average density variation only approaches about 4%. Note, however, that the standoff distance will probably change with tilt.

Figure 11:
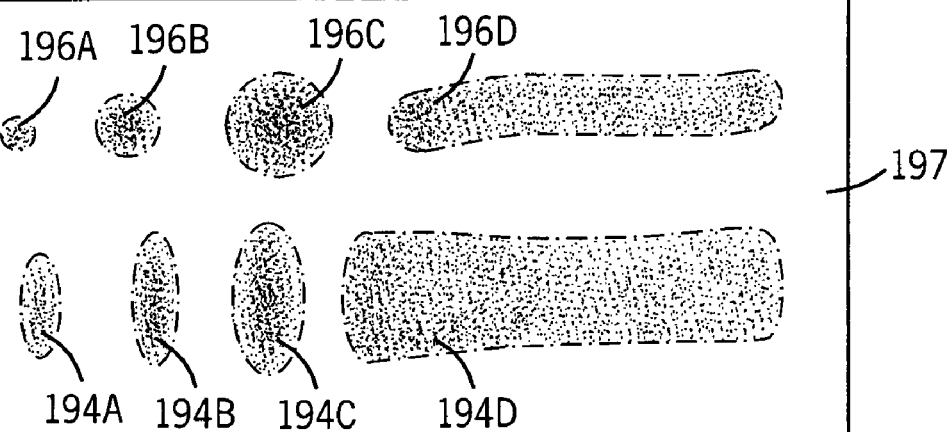
FIG. 11 is a schematic drawing illustrating various patterns produced on a virtual surface in accordance with the invention.

FIG. 11 illustrates representative virtual spray patterns for various spray gun controller 18 settings. Images 194a, 194b, 194c and 194d represent typical patterns from a spray gun controller 18 in which the pattern is vertically elliptical. Spray pattern 194a represents a pattern made by the spray gun controller positioned relatively close to the virtual surface 197 wherein the trigger is held to produce only a partial spray for a limited amount of time. Pattern 194b represents a vertically elliptical pattern in which the spray gun controller 18 is held at a slightly farther distance away from the virtual surface 197 and more virtual finish (relative to the amount applied for image 194a) is applied. Image 194c depicts a vertically elliptical image wherein the spray gun controller 18 is positioned still farther away from the virtual surface 197 and even more finish is applied. Image 194d illustrates the same spray gun controller 197 being moved along the screen 197. Images 196a, 196b, 196c and 196d are the patterns produced by a user under the same conditions except that the spray gun controller 18 settings are such that the elliptical pattern becomes circular. Such a situation might occur, for example, if a small circular pattern is required to paint a small part or to apply coating over stencil. A small circular pattern can be an advantage when virtual banding a large or complex part.

In the preferred system, each location (e.g. texel) on the projection screen 16 on which the virtual surface is projected has an associated alpha channel. The alpha channel controls transparency of the coating at that location based on the mathematical accumulation of virtual spray at the given location, thus realistically simulating fade-in for partial coverage on the virtual surface. For each timing cycle, the total mass deposited is distributed over the spray pattern generated by the paint model 106 at the locations that the spray pattern would impinge on the virtual surface. Thus, depending on the settings on the spray gun controller 18, and the position of the trigger, as well as the standoff distance and orientation of the spray gun 18 with respect to the virtual surface, the software maintains accumulation values at each location (via the alpha channel). The virtual paint on the work piece is displayed according to the alpha channel information and the display or color modes selected by the user on the graphical user interface 38.

It should be apparent to those skilled in the art that the preferred virtual coatings application system 12 described herein includes many features designed to enhance the realism of spray painter or technician training as well as performance monitoring of training sessions. For example, it displays overspray, uses sound to simulate actual pressurized air coming from the spray gun, allows for pressure, fan size and fluid flow rate adjustments, displays real time performance data on the graphical user interface and on the projection screen, allows many visual feedback mechanisms to be toggled on and off, displays an accurate spray pattern that realistically simulates real life painting, allows for paint build thickness to be defined, uses color to alert the user that too much or not enough paint has been applied to a particular area of the part. Because the paint model is based on spray patterns collected from actual spray painting as well as mass transfer, the model realistically simulates actual spray painting. Moreover, the instrumented spray gun controller allows the user to adjust settings on the gun with the turn of a knob as they would if they were in the field painting a real part. In addition, the variable trigger allows for realistic partial sprays, thus again adding to the overall realism provided by the system.

Importantly, the system 12 can be modified to include additional models for other types of spray gun controllers 18 in addition to a controller simulating a high volume low pressure spray gun as disclosed in accordance with the preferred embodiment of the invention.

Those skilled in the art should appreciate that the embodiments of the invention disclosed herein are illustrative and not limiting. Since certain changes may be made without departing from the scope of the invention, it is intended that all matter contained in the above description and shown in the accompanying drawings be interpreted as illustrative and not in a limiting sense.

We claim:

1. A virtual coatings application system comprising:
a display screen on which a virtual surface is displayed;
an instrumented spray gun controller outputting one or more signals representing virtual spray gun data;
a motion tracking system that tracks the position and orientation of the spray gun controller with respect to the virtual surface on the display screen; and
a computer programmed with software which generates virtual spray pattern data in response to at least the virtual spray gun data and the position and the orientation data received from the tracking system; and
wherein a virtual spray pattern image is displayed in real time on the display screen in accordance with the mathematical accumulation of virtual spray pattern data per unit time at each location on the virtual surface; and
wherein the software comprises a mathematical paint model that outputs virtual spray pattern data to characterize the resulting pattern of the virtual spray as a function of time in response to at least standoff distance and angular orientation of the spray gun controller relative to the virtual surface as well as virtual spray characteristic data representing settings for various spray gun settings; and further wherein the mathematical paint model is based at least on actual data collected from spray patterns generated for various spray gun settings, said paint model outputting virtual spray pattern data to characterize the resulting pattern of the virtual spray in terms of spatter size and density on the virtual surface as a function of time and simulates coverage and build thickness in the following manner:
inner elliptical radii for width ($r_{iw}$) and height ($r_{ih}$) define an area of constant rate finish coverage;
outer elliptical radii for width ($r_{ow}$) and height ($r_{ih}$) define the outer extent to which the rate of finish coverage becomes negligible, the rate of finish coverage falling off linearly between inner and outer elliptical radii so that coverage at the outer radii is equal to zero;
spatter droplet size is linearly distributed throughout from a minimum spatter droplet size to a maximum spatter droplet size; and
wherein overall pattern dimensions are modified linearly with standoff distance and coverage rates for uniform spray and spatter vary inversely with standoff distance, while spatter size remains constant with respect to standoff distance.

2. A virtual coatings application system as recited in claim 1 wherein the paint model is based on empirically derived values for the flow rate of paint sprayed for various spray gun settings and finish type.

3. A virtual coatings application system as recited in claim 2 wherein the amount of paint sprayed per unit time is determined by the paint model in relation to at least the position of a trigger on the instrumented spray gun controller.

4. A virtual coatings application system as recited in claim 1 wherein the paint model is based at least in part on empirically derived data for the transfer efficiency for a given spray gun position and finish type.

5. A virtual coatings application system as recited in claim 1 wherein the paint model compensates for tilt and rotation of the spray gun controller with respect to the virtual surface by displacing and rotating the coverage pattern and modifying the coverage density according to collected data.

6. A virtual coatings application system as recited in claim 1 wherein each location on the screen displaying the virtual surface has an associated alpha channel, the alpha channel controlling transparency of the coating at that location based on the mathematical accumulation of virtual spray at the given location, thus realistically simulating fade-in or partial cover on the virtual surface.

7. A virtual coatings application system as recited in claim 1 wherein multiple distinct colors depict respective ranges of accumulation of virtual spray pattern data on the virtual surface at a given location.

8. A virtual coatings application system as recited in claim 1 wherein the software also provides part image data for an image of a part to be displayed on the display screen defining the virtual surface, and wherein the image of the part is displayed on the screen defining the virtual surface as the target for the user using the spray gun controller.

9. A virtual coatings application system as recited in claim 8 wherein the image of the part displayed on the screen defining the virtual surface is a two-dimensional image.

10. A virtual coatings application system as recited in claim 8 wherein the virtual spray pattern image depicts virtual overspray distinct from virtual spray on the part.

11. A virtual coatings application system as recited in claim 1 further comprising:
one or more loudspeakers;
wherein the computer programmed with software also interactively generates an output sound signal in response at least to the activation of the system to generate a virtual spray pattern image in real time on the display screen and provides the output sound signal in real time to drive the one or more loudspeakers to simulate the sound of compressed air coming from a spray gun.

12. A virtual coatings application system as recited in claim 11 wherein the system further comprises the capability of setting an air pressure level for compressed air virtually supplied to the instrumented spray gun controller, and the volume of sound generated by the loudspeakers depends at least on the air pressure setting.

13. A virtual coatings application system as in claim 1 further comprising:
a display screen on which a virtual surface is displayed;
performance monitoring software on a computer that monitors the performance of the user at least in terms of virtual transfer efficiency and virtual build efficiency.

14. A virtual coatings application system comprising:
a display screen defining a virtual surface;
an instrumented spray gun controller outputting virtual spray gun data;
a motion tracking system that tracks the position and orientation of the spray gun controller with respect to the virtual surface defined by the display screen; and
a computer programmed with software implementing a paint model which generates virtual spray pattern data for a timing cycle in response to at least the virtual spray gun data and the position and the orientation data received from the tracking system for said timing cycle, wherein the paint model accounts for the effects of transfer inefficiencies due to shear effect when generating the virtual spray pattern data; and
wherein a virtual spray pattern image is displayed in real time on the display screen in accordance with the accumulation of virtual spray pattern data at each location on the virtual surface; and wherein the paint model simulates coverage and build thickness in the following manner:
inner elliptical radii for width ($r_{iw}$) and ($r_{ih}$) define an area of constant rate finish coverage;
outer elliptical radii for width ($r_{ow}$) and height ($r_{jh}$) define the outer extent to which the rate of finish coverage becomes negligible, the rate of finish coverage falling off linearly between inner and outer elliptical radii so that coverage at the outer radii is equal to zero;
spatter droplet size is linearly distributed throughout from a minimum spatter droplet size to a maximum spatter droplet size; and
wherein overall pattern dimensions are modified linearly with standoff distance and coverage rates for uniform spray and spatter vary inversely with standoff distance, while spatter size remains constant with respect to standoff distance.

15. A virtual coatings application system as recited in claim 14 wherein the effects of transfer inefficiencies due to shear effect in the paint model are based on empirically based data collected under normal working conditions.

16. A virtual coatings application system as recited in claim 14 wherein transfer efficiency due to shear effect generally varies inversely with standoff distance between the spray gun controller and the virtual work surface.

17. A virtual coatings application system as recited in claim 14 wherein the instrumented spray gun controller comprises:
a variably positionable trigger and a trigger sensor for detecting the position of the trigger and generating a trigger signal representing trigger position data in response thereto, the trigger signal being sent to the computer, wherein the paint model uses said trigger position data to generate the virtual spray pattern data for the respective timing cycle.

18. A virtual coatings application system as recited in claim 17 wherein the instrumented spray gun controller comprises:
a flow rate knob that rotates to allow for the adjustment of the maximum virtual fluid flow rate for the spray gun controller; and
a sensor that senses the position of the flow rate knob and generates a maximum virtual fluid flow rate signal which is sent to the computer and used to scale the trigger position data.

19. A virtual coatings application system as recited in claim 18 wherein the paint model determines value for flow rate of paint sprayed for various gun settings, finish type and trigger position, these values being based on interpolations of empirically derived data.

20. A virtual coatings application system as recited in claim 19 wherein the paint model determines the maximum amount of paint deposited on the virtual surface by multiplying the transfer efficiency by the flow rate of paint sprayed for the given timing cycle.

21. A virtual coatings application system as recited in claim 20 wherein the virtual spray pattern data generated by the paint model for the respective timing cycle simulates coverage rate over the spray pattern by distributing the total virtually transferred fluid flow for the timing cycle over a virtual spray pattern for the timing cycle.

* * * * *